(12) United States Patent
Ferlitsch

(10) Patent No.: US 7,218,410 B2
(45) Date of Patent: May 15, 2007

(54) DRIVERLESS, SELECTABLE MULTI-OPTION TIFF PRINTING

(75) Inventor: Andrew Rodney Ferlitsch, Tigard, OR (US)

(73) Assignee: Sharp Laboratories of American Inc., Camas, WA (US)

(*) Notice: Subject to any disclaimer, the term of this patent is extended or adjusted under 35 U.S.C. 154(b) by 1015 days.

(21) Appl. No.: 10/164,136

(22) Filed: Jun. 5, 2002

(65) Prior Publication Data

US 2003/0227639 A1  Dec. 11, 2003

(51) Int. Cl.
G06F 15/00 (2006.01)
G06K 1/00 (2006.01)

(52) U.S. Cl. ............... 358/1.15; 358/1.13; 358/1.18; 358/402

(58) Field of Classification Search ........... 358/1.18, 358/1.15, 402; 715/500, 517, 525
See application file for complete search history.

(56) References Cited

U.S. PATENT DOCUMENTS

| 5,867,633 | A | | 2/1999 | Taylor et al. | |
|---|---|---|---|---|---|
| 6,088,710 | A | * | 7/2000 | Dreyer et al. | 715/517 |
| 6,128,101 | A | * | 10/2000 | Saito | 358/402 |
| 6,205,452 | B1 | * | 3/2001 | Warmus et al. | 715/500 |
| 6,332,149 | B1 | * | 12/2001 | Warmus et al. | 715/517 |
| 6,441,916 | B1 | * | 8/2002 | Toyoda | 358/1.15 |
| 6,844,940 | B2 | * | 1/2005 | Warmus et al. | 358/1.18 |
| 6,952,801 | B2 | * | 10/2005 | Warmus et al. | 715/525 |
| 6,992,789 | B2 | * | 1/2006 | Czyszczewski et al. | 358/1.18 |
| 2002/0063888 | A1 | * | 5/2002 | Hisatake et al. | 358/1.15 |
| 2002/0163673 | A1 | * | 11/2002 | Toyoda | 358/402 |

FOREIGN PATENT DOCUMENTS

EP  1156409  11/2001

* cited by examiner

Primary Examiner—Kimberly Williams
Assistant Examiner—Satwant Singh
(74) Attorney, Agent, or Firm—Jon M. Dickinson, PC; Robert D. Varitz, PC (57) ABSTRACT

Proposed by the present invention is (a) a method, (b) structure for implementing the method, and (c) a resulting data structure that comes from implementation of the method, relating to introducing various modifications into the image file directory data contents in an otherwise conventional TIFF multi-page document data structure. Modifications are made in order to change the behavior of a printing device which is called upon to print the document, so as to implement rasterization-free, driverless, mulit-selectible-print-option printing of the document.

13 Claims, 4 Drawing Sheets

Fig. 8 — 2 PAGE - 3 COPIES

Fig. 9 — PORTRAIT/LANDSCAPE

DRIVERLESS, SELECTABLE MULTI-OPTION TIFF PRINTING

BACKGROUND AND SUMMARY OF THE INVENTION

This invention relates to the printing of multi-page documents from a TIFF file, and specifically to the driverless printing of such documents, in a manner which also enables the convenient implementation and performance of a multiplicity of conventional print options. In particular, the invention features methodology, related apparatus, and a TIFF-file data structure which involve modifications in the Image File Directory (IFD) portion(s) of that data structure.

IFD data in a TIFF file is associated with each page-specific (image) data unit, and such IFD data is normally organized to establish regular, serial-order sequential printing of pages. The IFD data includes operational path pointers for directing this normal activity.

As will be seen, the invention provides an easy and elegant way to utilize the internal structure of a TIFF file per se to enable driverless, rasterization-free, multi-option-capability, TIFF-file printing.

According to a preferred manner of practicing the invention, what is proposed is that modifications be appropriately made in what would otherwise be a conventional TIFF-file data structure to alter, in various ways, the page-order and/or page-orientation contents only of IFD data contained in that data structure. Associated image data, per se is not altered. Such page-order and/or page-orientation modifications can readily enable rasterization-free, driverless implementation of multi-page-printing, with full access to a wide range of conventional print options, such as document page splitting, page-specific printing with respect to certain selected pages, face-down and face-up printing where desired, multi-copy per-page printing of selected pages from a file, collated multi-page printing, uncollated multi-page printing, and many others.

The IFD changes which are made in accordance with practice of this invention relate only to page-order and/or page-orientation tag changes include, in general terms, (a) additions, (b) subtractions, and (c) internal modifications, as by the rewriting of pointers.

The methodology of the invention can be described, from a general point of view, as a driverless method for altering, selectively, and solely, the hierarchy (i.e., the order) of page printing from a multi-page TIFF file, and/or the page-orientation tag data, which altering includes the steps of intercepting such a TIFF file upstream from a printer, and then appropriately changing just the page-order tags and/or the page-orientation tags of IFD data present in that file so as to implement, in a driverless manner, a selected print option which differentiates from normal TIFF-file printing. Another way of viewing the methodology of the invention is that it involves creating a multi-page TIFF file for printing, including creating only modified-from-standard IFD page-order and/or page-orientation data in the file. Such modified data includes information that directs the operation of page printing in accordance with the selected print option.

Structure proposed in accordance with the present invention is that which is capable of implementing the methodology just expressed above, and the invention also features unique structure in the revised IFD page-order and/or page-orientation data per se.

These and other objects and advantages which are attained by the invention will become more fully apparent as the description that now follow is read in conjunction with the accompanying drawings.

DETAILED DESCRIPTION OF THE INVENTION

Turning now to the drawings, as this description moves through each of the nine drawing figures herein, the elegance, simplicity, and versatility of the present invention should become very apparent with respect to its ability to accommodate rasterization-free, driverless, multi-option-selectability of print options with respect to the carrying out of multi-page TIFF-file print jobs. Each of these drawing figures, which is largely self-explainatory, illustrates one or more practices and embodiments of the present invention. The entire collection of drawing figures, however, is not exhaustively illustrative of all possible print options which can be implemented in accordance with practice of this invention. How to invoke such other options in accordance with this invention will become apparent to those skilled in the art from the several specific illustrations presented herein. In each of FIGS. 2–9, inclusive, outrigger arrows are presented on one or both side of the pictured block portions of the figures. These arrows illustrate changes that have been made, in accordance with the present invention, in the operation of IFD operational pointers to enable selected-option printing of the represented TIFF file.

Figures 1, 3:
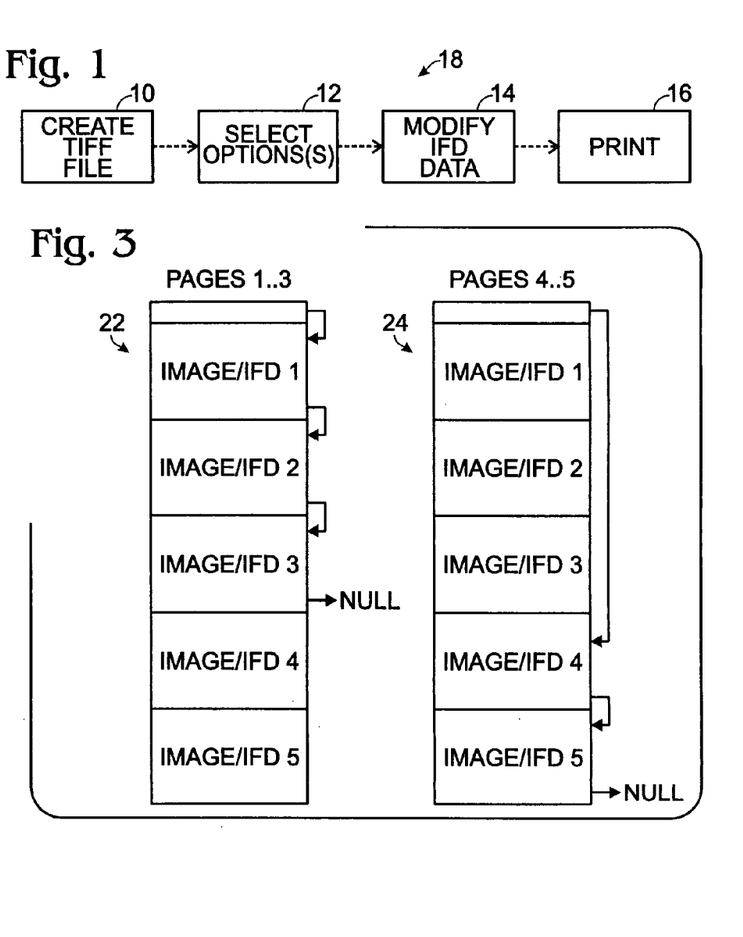
FIG. 1 is a simplified block/schematic diagram generally illustrating the methodological and structural organization proposed by the present invention.
FIG. 3 (two different views) illustrates multiple-page, document-page splitting of pages in a TIFF file in accordance with the invention.

With this understood, and turning attention first of all to FIG. 1, here, in an overall or overview sense, the structure and methodology which are basic to the implementation and practice of the present invention is diagrammed in four blocks which are labeled 10, 12, 14, 16. Collectively, these four blocks, which are pointed to by single arrow 18, represent a high-level comprehensive view of the practice and the structure of this invention. Block 10 relates to the creation of a multi-page TIFF file, such as under the control of a suitable document-creating application in a computer. In block 12, the user selects one or more print options which is/are to be implemented with respect to printing of this multi-page document file. Block 14 represents the practice and structure for creating appropriate page-order and/or page-orientation modifications in the Image File Directory (IFD) data content of the created TIFF file. It is within the operation and practice of block 14 that an otherwise conventional page-order, and/or page-orientation, content of IFD TIFF-file data is changed, by adding information, by subtracting information, and/or by modifying information, so as to enable rasterization-free, driverless performance of various print-options by an otherwise conventional printing environment represented by block 16. It is within the operation represented by block 14 that the methodology of the present invention, with respect to enablement of multi-print-option selectability, becomes implemented. In each of the now to be discussed drawing figures, what takes place within the purview of block 14 is more specifically shown diagramatically with respect to several, different, multi-page, document-print options.

Figure 2:
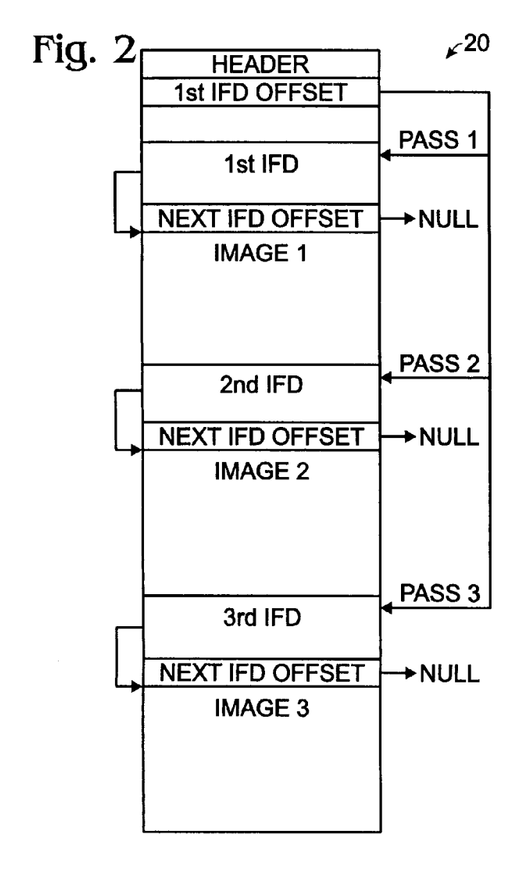
FIG. 2 is a block/schematic diagram illustrating direct TIFF printing with multi-page TIFF emulation, thus to enable printing of multiple pages in a system arrangement which nominally supports only a single-page TIFF file.

With attention directed to FIG. 2, here, indicated generally at 20, is a block/schematic layout of direct TIFF printing utilizing multi-page TIFF emulation in accordance with the present invention. Those familiar with, and skilled in, the art will recognize from a glance at this drawing figure how manipulation of the IFD data in the TIFF file structure shown in FIG. 2 can enable multi-page emulation.

This embodiment of the invention addresses the issue of printing a multiple-page TIFF file to firmware (i.e. a structural arrangement) that nominally supports only a single-page TIFF file. To print multiple pages, a printing device typically constructs a separate print job on a per-page basis. This print job may be constructed by, for example, a document-creating application, some background process, a printer driver, a spooler, a print processor, or a print assistant that is inserted somewhere in the relevant print-data stream.

The invention approaches this task by not creating a separate physical spool file. Instead, TIFF data is directly written to the port manager for the specified printing device, or devices, and the data is modified in memory in an appropriate manner. In accordance with the invention, printing of multiple pages on what is otherwise a single-page TIFF reader is accomplished by modifying and altering the IFD page-order pointer which is directed to the first IFD in the file. The IFD describes the contents and locations of an image (i.e. a page); each page in the file has a separate IFD; and each IFD is sequentially linked to the next IFD in the file.

Referring to FIG. 2, printing of each successive page in the represented TIFF file is accomplished by changing the value of the first IFD offset to the IFD offset that corresponds to that particular successive page. For example, with respect to a three-page TIFF file, that file would be written AS-IS to the printer for page one. For page two, the first IFD offset would be changed in memory to identify the IFD offset of the second page as the TIFF file is written to the printer. For the third page, the first IFD offset would be changed, again in memory, to the appropriate IFD offset for the third page as the file is written to the printer. Table I immediately below sets forth the detailed algorithm for implementing this multi-page TIFF printing emulation option exercised and accommodated in accordance with practice of the present invention.

TABLE I

```
////-------------Multi-Page TIFF Printing Emulation on Single Page Baseline
TIFF Reader-------------////
// Find and Record the IFD offsets in the TIFF file
//
call subroutine FindRecordIFDOffsets( )
// Write each page to Printer
//
for each page in TIFF file
{
        // Schedule a new Print Job
        //
        Start Print Job
        // Rewind TIFF file
        //
        Seek to the 1st byte in TIFF file
        // Write Header to Printer
        //
        Read 4 byte header in TIFF file
        Write 4 byte header to printer
        // Write IFD offset for the 1st IFD on this print job
        //
        Write the recorded IFD offset of the next IFD image (i.e., page)
        to the printer
        // Discard original 1st IFD offset
        //
        Seek to the 9th in the TIFF file
        // Write remainder of the TIFF file to the Printer
        //
        While (reading remaining contents of TIFF file)
        {
                write remaining contents of TIFF file to printer
        }
        // Finish Print Job
        //
        End Print Job on Printer
}
```

FIG. 3 in the drawings presents at 22, 24 two block/schematic diagrams that give two illustrations of direct TIFF printing with selective document splitting in accordance with the invention. Pictured in these two illustrations is a five-page TIFF file with respect to which, according to the illustration designated 22, only pages one, two and three are to be printed. The illustration designated at 24 pictures selective printing of only pages four and five.

In implementing this version/embodiment of the present invention, the TIFF reader employed in the particular printing device or devices is (are) presumed to be capable of supporting multiple-page TIFF formats. In a case where the employed TIFF reader is one which supports only single-page TIFF formats, the process illustrated in FIG. 3 for emulating document splitting can still be accomplished in accordance with the invention, as will become apparent to those skilled in the art, simply by combining the method now to be described herein with respect to FIG. 3 along with the methodology pictured and described with regard to FIG. 2.

The printing of selected pages in a document-splitting practice according to the invention is accomplished, as an illustration, by changing the value of the first IFD offset to the IFD offset of the first page in the corresponding page sequence which is to be printed, and by changing the value of the IFD offset of the last page in the corresponding page sequence. For example, on a ten-page document which is to be split into page sequences 1–5, inclusive, and 6–10, inclusive, the TIFF for the first sequence would be sent to a printer with the next IFD offset of the fifth page image changed to zero in memory to indicate the last page. The second sequence would be sent to the printer with the first IFD offset changed to the IFD offset of the sixth page image in memory to indicate the first page.

This just-described approach is pictured for the splitting of a five-page TIFF file document into two sequences, with one including pages 1–3, inclusive, and the second including pages 4 and 5.

An appropriate algorithm to accomplish this in accordance with the invention is set forth below in Table II

TABLE II

Figure 4:
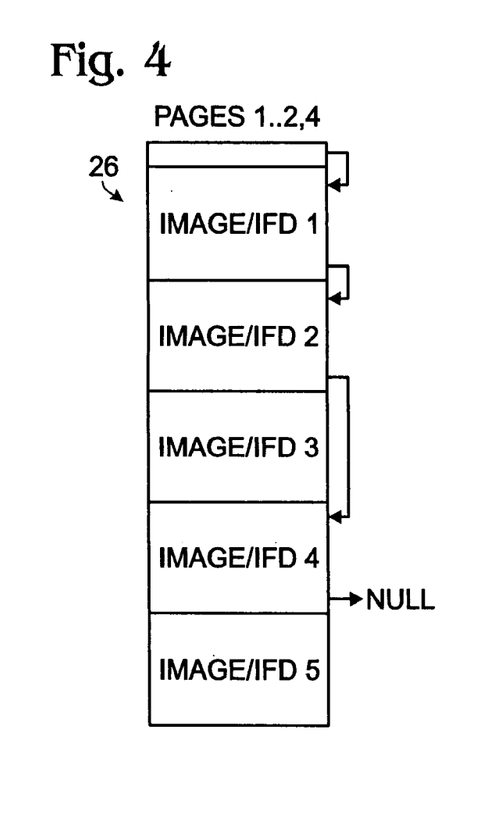
FIG. 4 illustrates implementation according to the invention of a print option allowing for selective page-specific printing of just certain pages represented in a TIFF file.

////-------------Document Splitting on Multi-Page TIFF Reader-------------////
// Find and Record the IFD offsets in the TIFF file
//
call subroutine FindRecordIFDOffsets( )
// Write each page sequence to Printer
//
for each page sequence
{
    // Schedule a new Print Job
    //
    Start Print Job
    // Rewind TIFF file
    //
    Seek to the 1$^{st}$ byte in TIFF file
    // Write Header to Printer
    //
    Read 4 byte header in TIFF file
    Write 4 byte header to printer
    // Write IFD offset for the 1$^{st}$ IFD on this print job
    //
    Write the recorded IFD offset of 1$^{st}$ page in this page sequence to the printer
    // Discard original 1$^{st}$ IFD offset
    Seek to the 9$^{th}$ byte in the TIFF File
    // Write Remainder of TIFF file to Printer
    While (reading remaining contents of TIFF file)
    {
        if (file offset of the last page's IFD in the page sequence
        {
            Read the IFD entries from TIFF file
            Write the IFD entries to printer
            Read and Discard next IFD offset from TIFF file
            Write 4 byte 0 zero value as next IFD offset to Printer
            continue
        }
        write remaining contents of TIFF file to printer
    }
End Print Job FIG. 4 in the drawings illustrates at 26 a block/schematic diagram showing direct TIFF printing implementing non-consecutive page-sequence printing, also referred to herein as selective page-specific printing, from a TIFF file. In this version of the invention, the TIFF reader in the printing device which is to be employed is assumed to support multiple-page TIFF formats, but as was mentioned above with respect to the last-described embodiment of the invention, the process now to be described can be accomplished in a situation where only single-page TIFF formats are supported, by combining the method now to be described with methodology already described above herein.

The printing of so-called page sequences is accomplished principally by manipulating one or more IFD offsets corresponding to the pages in the non-consecutive sequence. For example, this is accomplished by changing the value of the first IFD offset to the IFD of the first page in the non-consecutive page sequence, and by changing the next IFD offset of this page to the IFD offset of the next page in the non-consecutive sequence, and so forth. The next IFD offset of the last page in the non-consecutive page sequence is set to zero (null) to indicate the end of the sequence. For example, the non-consecutive page sequence 1–2, inclusive, and 4 out of a five-page document would be sent to the TIFF reader in the printing device with the IFD offset of the second page changed to the IFD offset of the fourth page, and the IFD offset of the fourth page changed to zero (null) to indicate the end of the non-consecutive selected sequence. Table III immediately below illustrates the algorithm appropriate for this behavior of what is shown in FIG. 4.

TABLE III

Figure 5:
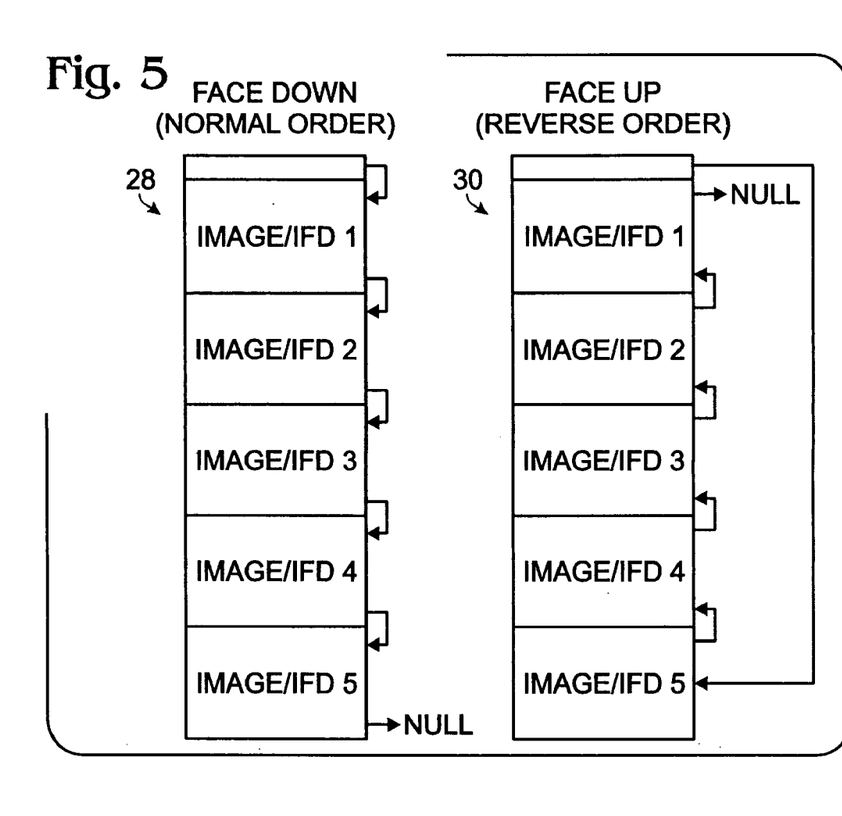
FIG. 5 (two views) illustrates, on the left side of the figure, face-down (normal order) printing from a TIFF file, and on the right side, face-up (reverse order) printing from a TIFF file in accordance with the present invention.

////-------------Non-Consecutive Page Sequences on Multi-Page TIFF Reader-------------////
// Find File and Record the IFD offsets in the TIFF file
//
call subroutine FindRecordIFDOffsets( )
// Schedule a new Print job
//
Start Print Job
// Rewind TIFF file
//
Seek to the 1$^{st}$ byte in TIFF file
// Write Header to Printer
//
Read 4 byte header in TIFF file
Write 4 byte header to printer
// Write IFD offset for the 1$^{st}$ IFD on this print job
//
Write the recorded IFD offset of 1$^{st}$ page in the non-consecutive page sequence to printer
// Discard original 1$^{st}$ IFD offset
//
Seek to the 9$^{th}$ byte in the TIFF File
// Write Remainder of TIFF file to Printer
//
While (reading remaining contents of TIFF file)
{
    if (IFD offset of page in non-consecutive page sequence)
    {
        Read the IFD entries from TIFF file
        Write the IFD entries to printer
        Read and Discard the next IFD offset from TIFF file
        Write IFD offset of next page in non-consecutive page sequence to printer
        continue
    }
    write remaining contents of TIFF file to printer
}
// Finish Print Job
End Print Job FIG. 5 in the drawings illustrates at 28 a block/schematic diagram depicting face-down (normal order) collation printing, and at 30, a block/schematic illustration of face-up (reverse order) collation printing practiced in accordance with the invention.

Face-down printing is, of course, a normal order print sequence for handling by a conventional TIFF file. Here, little if any IFD manipulation is required unless there is, in addition, some further print option to be implemented which, while generally calling for a normal order arrangement of printing, nevertheless introduces some additional requirement that invokes the need to change IFD data in some fashion. Face-up printing, however, requires a specifically related change in IFD data content.

To accomplish face-up, reverse-order printing according to the invention, all of the IFD offsets normally presented in the standard TIFF file data format are reversed, in order to assure that images are printed in a manner which will result in face-up collation. In reverse-order, face-up printing, the numeric last page in the file is printed first, the next to last numbered page is printed second, the third from last page is printed third, etc. A completed job results in the presentation to the user of a printed document which reads, from top to bottom, first-to-last page.

Printing a face-up collated page sequence in accordance with the invention, thus, is accomplished by changing the value of the first IFD offset to the last page, the next IFD offset of the first page to zero (null), and all of the remaining next IFD offsets to the IFD offset of the prior page. For example, in a four-page document, the first IFD offset is set to the fourth page, the next IFD offset of the fourth page is set to the third page, the next offset of the third page is set to the second page, the next IFD offset of the second page is set to the first page, and the IFD offset of the first page is set to zero (null) to indicate the last page of the job.

Table IV immediately below presents an algorithm for accomplishing this performance.

TABLE IV

```
// Find and Record the IFD offsets in the TIFF file
//
call subroutine FindRecordIFDOffsets( )
// Schedule a new Print Job
//
Start Print Job
// Rewind TIFF file
//
Seek to the 1st byte in TIFF file
// Write Header to Printer
//
Read 4 byte header in TIFF file
Write 4 byte header to printer
// Write IFD offset for the 1st IFD on this print job
//
Write the recorded IFD offset of last page to printer
// Discard original 1st IFD offset
//
Seek to the 9th byte in the TIFF File
// Write Remainder of TIFF file to Printer
//
While (reading remaining contents of TIFF file)
{
        if (IFD offset of page)
        {
                Read the IFD entries from TIFF file
                Write the IFD entries to printer
                Read and Discard next IFD offset from TIFF file
                If (1st Page)
                        Write 4 byte 0 to indicate last page to printer
                else
                        Write IFD offset of previous page to Printer
                continue
        }
        write remaining contents of TIFF file to printer
}
// Finish Print Job
End Print Job
```

Figure 6:
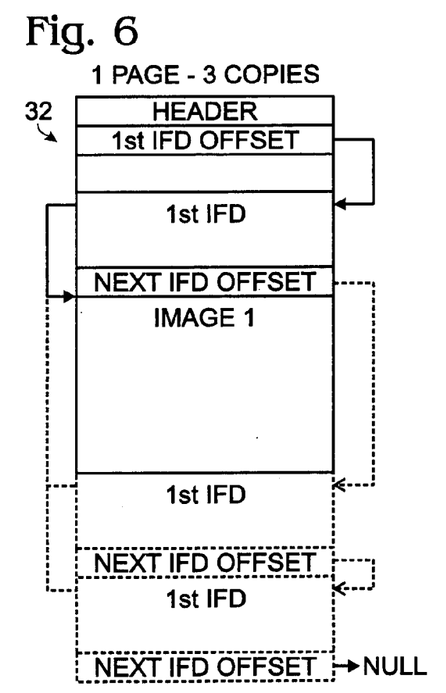
FIG. 6 illustrates selective, per-page multi-copy printing of selected pages from a TIFF file in accordance with the invention.

FIG. 6 in the drawings illustrates at 32 the practice, according to this invention, of direct TIFF printing of multiple copies of a single page in a multiple-page TIFF file. Such multi-copy printing selected from a multi-page TIFF file is accomplished by appending a copy of the first IFD to the end of the entire TIFF file for each copy which is greater than one in number, and by changing the value of the first IFD next IFD offset from zero (null) to the offset of the first IFD copy. The next IFD offset of each IFD copy is then altered to read to the next appended IFD copy, until the last IFD copy is reached, where the next IFD offset is set to zero (null) to indicate the last copy.

FIG. 6 specifically illustrates the printing of three duplicated copies of one page in a multi-page TIFF file in accordance with the practice just stated above.

Performance of the invention in accordance with this kind of print option works without repetitively sending image data per copy for printing, but instead by repetitively sending IFDs (which are relatively small data files, or sub-files), to point back to the original first image, so that the associated TIFF reader simply repeats reading and printing of the same page for each copy. One should note that image data offsets in the IFD entries according to this practice of the invention progress from the beginning of the file, and thus the IFD data does not need to be otherwise modified. For example, in a three-copy single-page print request, the first IFD would be parsed from the TIFF file, and appended to the end of the TIFF data once for each copy other than one that is called for in the specific print job. The original IFD represents the first copy. The next IFD offset of the first IFD is changed to point to the IFD offset of the first copy, thus yielding a second duplicate copy, and the next IFD offset of the first copy is set to the IFD offset of the second IFD copy, thus producing the third duplicate copy. The next IFD offset of the second IFD copy would be set to zero (null), thus to indicate the last called-for duplicate copy.

Table V immediately below presents an appropriate algorithm for this activity.

TABLE V

```
/////----------Single Page Multi-Copy on Multi-Page TIFF Reader----------////
// Find and Record the 1st IFD in the TIFF file
//
call subroutine FindRecord1stIFDData( )
//// Schedule a new Print Job
//
Start Print Job
// Rewind TIFF file
//
Seek to the 1st byte in TIFF file
// Write Header and 1st IFD offset to Printer
//
Read 8 byte header/1st IFD in TIFF file
Write 8 byte header/1st IFD to printer
// Write Remainder of TIFF file to Printer
//
While (reading remaining contents of TIFF file)
{
        // Change next IFD offset of 1st IFD
        //
        if (IFD offset of 1st page)
        {
                Read the IFD entries from TIFF file
                Write the IFD entries to printer
                Read and Discard the next IFD offset
                Write offset of End of File as next IFD offset
                continue
        }
        write remaining contents of TIFF file to printer
}
// Append a copy of the 1st IFD for each additional copy> 1
for each copy > 1
{
        Write 1st IFD data to printer
        If (last copy)
                Write 4 byte 0 to indicate last copy to the printer
        else
                Write offset of new End of File as next IFD offset to
                printer
}
// Finish Print Job
End Print Job
```

Figure 7:
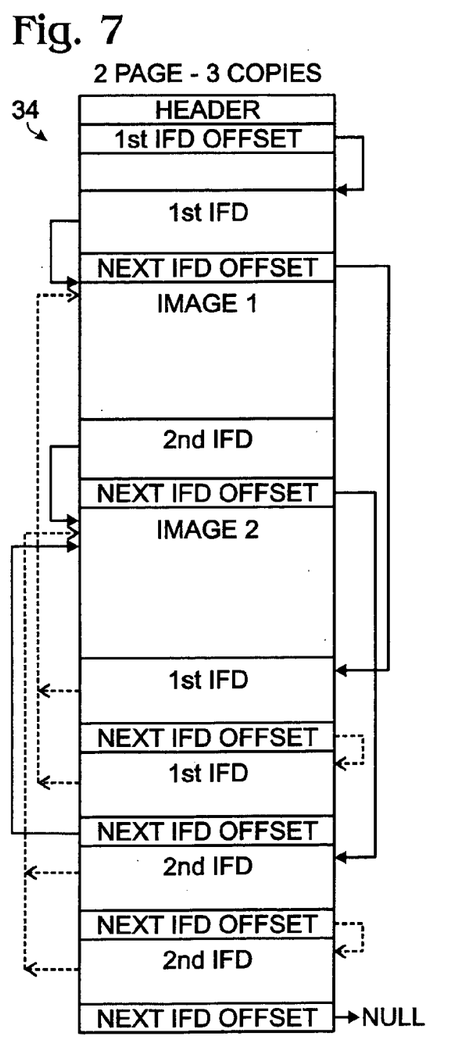
FIG. 7 is a block/schematic diagram picturing selective, uncollated multi-copy per-page printing of pages from a TIFF file in accordance with this invention.

Directing attention now to FIG. 7 in the drawings, here, what is illustrated at 34 is a block/schematic picturing of the practice according to the invention of what is referred to herein as selective, uncollated, multi-copy, per-page printing of pages from a multi-page TIFF file.

Printing multiple uncollated copies selected from a multiple-page TIFF file is accomplished by appending a copy of each page's IFD to the end of the TIFF for each copy requested which is greater than one in number, by changing the value of the first IFD next IFD offset from zero (null), to the offset of the first page's first IFD copy, and by changing the next IFD offset of each IFD copy to the next appended IFD copy, until the last IFD copy is reached, where the next IFD offset is set to zero (null), to indicate the last copy of the last called-for page.

For example, in a two page, two-copy print job, the IFDs for pages one and two are parsed from the TIFF file. The copy of the first IFD is appended to the end of the TIFF data, once per called-for copy greater than one in number. The next IFD offset of the first IFD is changed to point to the IFD offset of the first IFD copy (thus creating the second duplicate page copy), and the next IFD offset of the first IFD copy is set to the IFD of the second page. The copy of the second-page IFD is appended to the end of the TIFF data, once per called-for copy greater than one in number. The IFD offset of the second IFD is changed to point to the IFD offset of the second IFD copy (i.e. the second page copy) and the next IFD offset of the second IFD copy is set to zero (null), to indicate the last copy of the last page in the job.

Table VI below presents an appropriate algorithm.

TABLE VI

```
/////-------------Multiple Page Uncollated Multi-Copy on Multi-Page TIFF Reader-------------////
// Find and Record the IFDs and IFD offsets in the TIFF file
//
call subroutine FindRecordIFDOffsetsAndIFDData( )
// Schedule a new Print Job
//
Start Print Job
// Rewind TIFF file
//
Seek to the 1st byte in TIFF file
// Write Header and 1st IFD offset to Printer
//
Read 8 byte header/1st IFD in TIFF file
Write 8 byte header/1st IFD to printer
// Write the multiple copies per page
//
for each page in TIFF file
{
        // Write TIFF data to the Printer
        //
        While (reading contents of TIFF file)
        {
                // Change the IFD next offset to the corresponding IFD copy appended to data
                //
                if (IFD offset)
                {
                        Read the IFD entries form TIFF file
                        Write the IFD entries to printer
                        Read and Discard the next IFD offset
                        Write File Offset to corresponding IFD copy of page to printer
                }
                else
                        write contents of TIFF file to printer
        }
}
// Append IFD copies > 1 of each page in uncollated manner
//
for each page in TIFF file
{
        // Append IFD copies > 1 for this page to end of TIDD data
        //
        for copies > 1
        {
                Write IFD copy of page to printer
                // Last Copy, Point back to next page's original IFD, if not last page
                //
                If (last copy)
                {
                        If (last page)
                                Write 4 byte 0 to indicate the last copy of last page to printer
                        else
                                Write next IFD offset to offset of original IFD of next page to printer
                }
                // Point to next IFD copy of this page
                //
                else
                        Write offset of new End of File as next IFD offset to printer
        }
}
// Finish Print Job
//
End Print Job on Printer
```

Figures 8, 9:
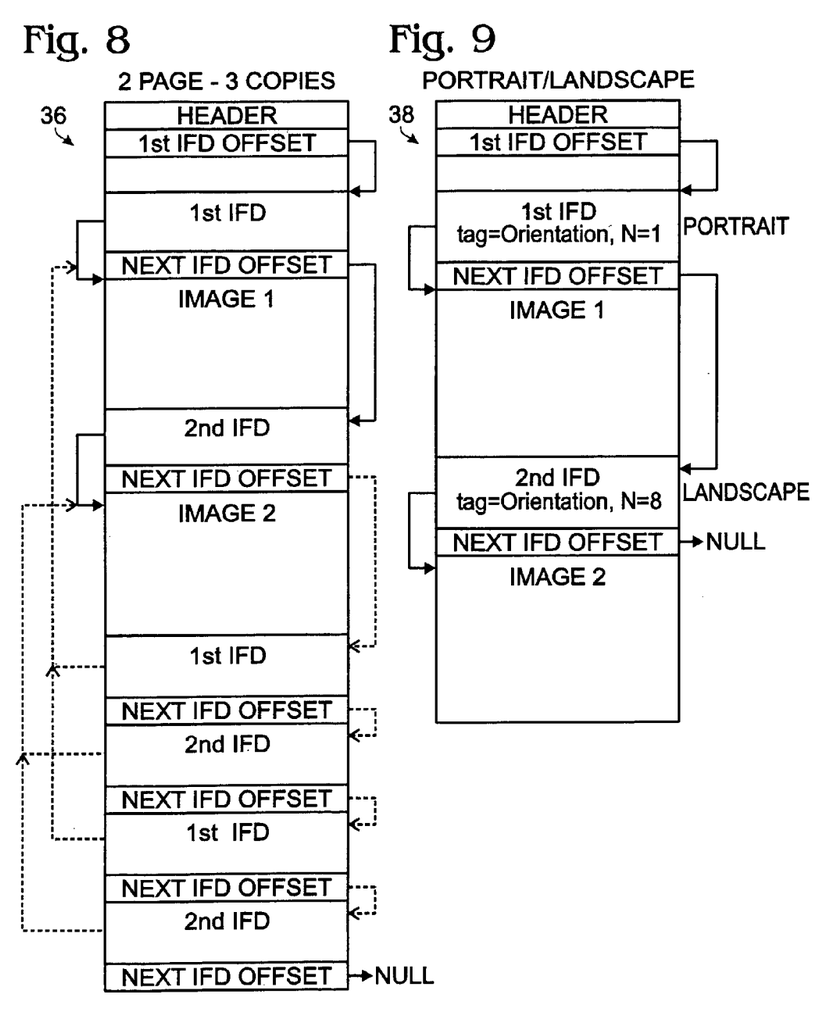
FIG. 8 is a block/schematic view showing selective, collated, multi-page, per-page printing of pages from a TIFF file in accordance with practice of the present invention.
FIG. 9 is a block/schematic diagram illustrating selective portrait or landscape printing of pages from a TIFF in accordance with practice of the present invention.

Addressing now what is shown in FIG. 8, here illustrated in block/schematic form at 36 is practice, according to the present invention, of direct TIFF printing of selected, collated, multi-page, per-page renditions of pages drawn from a TIFF file.

Printing of such multiple collated copies of a multi-page TIFF file is accomplished by appending a copy of each page's IFD to the end of the TIFF in sequential page order for each copy greater than one in number which is called for, by changing the value of the last page's next IFD offset from zero (null) to the offset of the first page's first IFD copy, and by changing the next IFD offset of each IFD copy to the next appended IFD copy until the last IFD copy is reached, where the next IFD offset is set to zero, or null, to indicate the last copy in the job.

For example, in a specific print job calling for two copies of two pages, the IFD for pages one and two would be parsed from the TIFF file. Copies of the first and second IFDs would be appended the end of the TIFF data in sequential page order once per copy in number greater than one. The next IFD offset of the last page's IFD would be changed to point to the IFD offset of the first IFD copy (thus yielding the first page of the second copy), and the next IFD offset of the first IFD copy would be set to the IFD of the second page IFD copy. The next IFD offset of the second page IFD copy would be set to zero (null), thus to indicate the end of the last copy.

Table VII below sets forth an appropriate algorithm for this behavior.

TABLE VII

```
////-------------Multiple Page Collated Multi-Copy on Multi-Page
TIFF Reader-----------////
// Find and Record the IFDs and IFD offsets in the TIFF file
//
call subroutine FindRecordIFDOffsetsAndIFDData( )
// Schedule a new Print Job
//
Start Print Job
// Rewind TIFF file
//
Seek to the 1st byte in TIFF file
// Write TIFF data to Printer
//
while (reading remaining TIFF data)
{
        // Last Page in 1st Copy
        //
        if (IFD offset of last page)
        {
                Read the IFD entries from TIFF file
                Write the IFD entries to printer
                Read and Discard the next IFD offset
                Write File Offset of End of File corresponding to 1st page
                of 2nd copy to printer
        }
        else
                write remaining TIFF data to printer
}
// Append IFD copies > 1 of each page in collated manner
//
for (copies > 1)
{
        // Append IFD of this page to end of TIFF data
        //
        for each page
        {
                Write IFD copy of this page to printer
                // End copies, Last Page of Last Copy
                //
                if (last page of last copy)
                {
                        Write 4 byte 0 to indicate last page of last copy to
                        printer
                }
                else
                        Write File Offset of End of File corresponding to
                        next page of copy to printer
        }
}
// Finish Print Job
//
End Print Job on Printer
```

FIG. 9 in the drawings presents at 38 a block/schematic diagram which explains how practice of the invention can be employed selectively to print pages from a TIFF file either in portrait or in landscape format, and specifically, illustrates a situation in which a part of the file is called for to be printed in portrait format, and the balance to be printed in landscape format.

Printing in landscape mode, which is not the normal default mode, is accomplished by rotating the image 90-degrees to the left, by setting the IFD directory entry for orientation to 8. $8=0^{th}$ row represents the visual left-hand side of the image, and the $0^{th}$ column represent the visual bottom of the image. Such printing in landscape mode is accomplished by parsing the IFD directory entries for the orientation entry, and by changing the entry, per page where required, to the value of 8.

Table VIII below describes and sets forth an algorithm for performing in this manner according to the invention.

TABLE VIII

```
////-------------Landscape Printing on TIFF Reader-------------////
// Schedule a new Print Job
//
Start Print job
// Rewind TIFF file
//
Seek to the 1st byte I TIFF file
// Write TIFF data to Printer
//
while (reading remaining TIFF data)
{
        //IFD of Page
        //
        if (IFD offset)
        {
                Read No. of Directory Entries
                // Parse and Write each Directory Entry to Printer
                //
                for each directory entry
                {
                        Write Tag, Count and Data Type to Printer
                        // Change Orientation Value to 8 (Landscape)
                        //
                        if (directory entry is orientation)
                                Write value of 8 in specified data type to
                                printer
                        else
                                Write Data Value in specified data type to
                                printer
                }
        }
}
// Finish Print Job
//
End Print Job on Printer
```

It will thus be apparent that the present invention proposes a unique and very elegant and sophisticated approach toward utilizing the page-order, and/or page-orientation, data content within an otherwise conventional TIFF multi-page data file to accomplish driverless, rasterization-free, direct TIFF printing under circumstances allowing free selection and implementation of a very wide range of popular print options. IFD data which becomes modified by practice of the present is limited to page-order, and/or page-orientation, tag data.

While a number of embodiments and manners of practicing the present invention have been fully described and illustrated herein, it is appreciated that variations and modifications may be made without departing from the spirit of the invention.

I claim:

1. A driverless page-image-data-independent method for selectively altering solely at least one of the order and orientation of page printing from a multi-page TIFF file comprising
    intercepting such a file upstream from a printer, and
    appropriately changing solely at least one of the page-order tag information and the page-orientation tag information in the Image File Directory (IFD) data present in that file.

2. The method of claim 1, wherein said changing involves at least one of the acts of varying, removing from, and adding to, at least one of page-order and page-orientation (IFD) data.

3. The method of claim 2, wherein said changing enables the multi-page printing of the pages in such a file in a printing-system configuration which normally supports only a single-page TIFF file.

4. The method of claim 2, wherein said changing enables document page splitting.

5. The method of claim 2, wherein said changing enables selective page-specific printing from such a file.

6. The method of claim 2, wherein said changing enables face-down printing of pages from such a file.

7. The method of claim 2, wherein said changing enables face-up printing of pages from such a file.

8. The method of claim 2, wherein said changing enables selective, per-page, multi-copy printing of pages from such a file.

9. The method of 2, wherein said changing enables selective, uncollated, multi-copy, per-page printing of pages from such as file.

10. The method of claim 2, wherein said changing enables selective, collated, multi-page, per-page printing of pages from such a file.

11. The method of claim 2, wherein said changing enables selective portrait or landscape printing of pages from such a file.

12. Full-function direct TIFF printing operative for a selected collection of plural print options comprising
    selecting from that collection a print option having a defined operating path with regard to a multi-page print job,
    establishing a TIFF file relative to that job, and
    within the architecture of that TIFF file, and without altering image data information, per se, specially and freely constructing the respective page Image File Directories, solely with regard to at least one of (a) the operative page-order pointers and (b) the page-orientation tags associated therein and therewith, to create a directly readable print-performance implementation from a printer which will cause printing in a manner following the defined operating path.

13. A print-image-information-independent system for performing driverless and selectively multi-print-option printing of pages from a plural-page TIFF file, where such multi-print-option printing involves page printing in a manner that differs from the normal TIFF page-printing hierarchy, which normal hierarchy involves the printing of pages in unbroken, regular serial, page-number order, said system comprising
    structure for creating a multi-page TIFF file including, as appropriate, Image File Directory (IFD) page-order, and/or page-orientation, tag information which is effective to guide the implementation of printing from the file, and
    IFD data-manipulation structure operatively connected to said file-creating structure, and operable selectively to modify solely at least one of (a) the page-order architecture, and (b) the page-orientation information, in IFD data in the file so as to promote the driverless printing implementation of a selected printing option.

* * * * *